United States Patent [19]

Hiramitsu et al.

[11] Patent Number: 5,178,409
[45] Date of Patent: Jan. 12, 1993

[54] STEERING WHEEL EQUIPPED WITH AN AIR BAG SYSTEM

[75] Inventors: Tetsushi Hiramitsu, Tsushima; Satoshi Ohno, Inazawa; Yutaka Kondo, Toyota, all of Japan

[73] Assignee: Toyoda Gosei Co., Ltd., Nishikasugai, Japan

[21] Appl. No.: 689,172

[22] Filed: Apr. 24, 1991

[30] Foreign Application Priority Data

Apr. 27, 1990 [JP] Japan .............................. 2-45637[U]

[51] Int. Cl.$^5$ ............................................ B60R 21/16
[52] U.S. Cl. .................................... 280/731; 280/735; 280/741
[58] Field of Search ............... 280/731, 735, 736, 741, 280/743; 364/567, 424.04

[56] References Cited

U.S. PATENT DOCUMENTS

| 3,742,858 | 3/1973 | Stonestrom | 280/735 X |
| 4,004,827 | 1/1977 | Kondo et al. | 280/743 X |
| 4,614,876 | 9/1986 | Mattes et al. | 180/268 X |
| 4,700,973 | 10/1987 | Gademann et al. | 280/735 |
| 4,938,504 | 3/1990 | Fukuda et al. | 280/735 X |
| 4,974,873 | 12/1990 | Kaiguchi et al. | 280/735 |
| 5,002,306 | 3/1991 | Hiramitsu et al. | 280/731 |
| 5,011,181 | 4/1991 | Laucht et al. | 280/735 X |
| 5,071,160 | 12/1991 | White et al. | 280/735 |

FOREIGN PATENT DOCUMENTS

| 2302715 | 8/1973 | Fed. Rep. of Germany | 280/735 |
| 3742383 | 6/1989 | Fed. Rep. of Germany | 280/736 |
| 0212149 | 9/1988 | Japan | 280/735 |
| 0219449 | 9/1988 | Japan | 280/731 |

Primary Examiner—H. Grant Skaggs
Assistant Examiner—Carol Lynn Druzbick
Attorney, Agent, or Firm—Cushman, Darby & Cushman

[57] ABSTRACT

Disclosed is a steering wheel equipped with an air bag system. The steering wheel has a controller having a processor which outputs a trigger signal for actuating an air bag in accordance with the strength of an impact arising from a collision of a car, upon sensing the impact, and a memory which stores a process by this processor; an inflator which generates a gas in accordance with a signal outputted from the controller; and an air bag which is inflated with the gas supplied from the inflator. Between the opposite surfaces of a controller case and an inflator case, there is provided a heat-insulating layer. This heat-insulating layer serves to reduce heat passing from the inflator to the controller when the air bag is inflated. Consequently, contents stored in the memory mounted in the controller will never be destroyed by heat, and it is possible to analyze the process of operation of the processor after a collision of a car body.

14 Claims, 5 Drawing Sheets

STEERING WHEEL EQUIPPED WITH AN AIR BAG SYSTEM

BACKGROUND OF THE INVENTION

1. Field of the Invention

The present invention relates to a steering wheel equipped with an air bag system.

2. Description of the Prior Art

It is known to make a steering wheel containing an air bag system in the lower part of a pad section for absorbing an impact in the event of a collision of a motor vehicle.

In the above-noted air bag system a controller and an air bag inflator which triggers the air bag to inflate are located close to each other, for the purpose of making the structure of the system compact. Besides, the inflator and the air bag are adjacently located. Inside the controller of the air bag system is mounted an electronic circuit for detecting impacts of the motor vehicle and outputting a trigger signal to the inflator. The memory of this electronic circuit stores contents of an acceleration detecting process and a signal processing process by the electronic circuit from the detection of an impact caused by a collision of the motor vehicle to the production of a trigger signal for starting the inflator. Since the memory is constructed by a nonvolatile storage or is backed up by a battery, the contents processed by the electronic circuit will have been stored in the memory even after the air bag has been inflated.

After the air bag has been inflated, the memory of the electronic circuit is removed from the steering wheel. This memory can be connected to an external diagnosis device, whereby contents of the memory are read out for analysis of the operational state or the signal processing of the electronic circuit performed until a trigger signal is produced. Such an air bag, however, has a drawback that when this operation analysis of the electronic circuit is conducted after the inflation of the air bag, stored data in some cases can not be read.

SUMMARY OF THE INVENTION

As a result of investigation of a cause of the above-described failure of reading stored data, the inventor has reached the conclusion that the memory is heated with heat caused by the triggering of the inflator and, the contents of the memory is destroyed. It has been found by the inventors that the temperature rise of the memory results from the heat caused by the triggering of the inflator and passing to the memory unit through a controller case and an inflator case which are mounted in direct contact with each other.

The present invention has been accomplished in an attempt to solve the problems mentioned above, and has as its object the protection of stored contents of a memory of an electronic circuit in the controller from being destroyed with heat caused by the operation of the inflator when the air bag system has been operated upon the detection of a collision of the motor vehicle.

In order to solve the aforesaid problem, in the steering wheel according to the present invention which comprises a controller with a built-in electronic circuit which, upon detecting a collision, outputs a signal, an inflator which generates a gas in accordance with the signal from the controller, and an air bag which is inflated with the gas from the inflator, a heat-insulating layer is provided between the surface of a controller case and the surface of an inflator case opposite to the surface of a controller case.

In the even of a collision, a signal is outputted from the controller to the inflator, which in turn actuates the air bag system.

With the operation of the inflator the temperature of the inflator case rises.

However, due to a heat-insulating layer between the opposite surfaces of the controller case and the inflator case, the heat thus occurring at the time of inflator operation will not pass directly to the controller.

Therefore, the heat from the inflator will never cause the temperature of the controller interior to rise very high, and the memory of the electronic circuit in the controller will never be destroyed.

Other and further objects and advantages of the present invention will become apparent during the following discussion of the accompanying drawings.

DESCRIPTION OF THE INVENTION

Hereinafter the embodiments of a steering wheel equipped with an air bag system according to the present invention will be described with reference to the accompanying drawings.

First Embodiment

Figure 3:
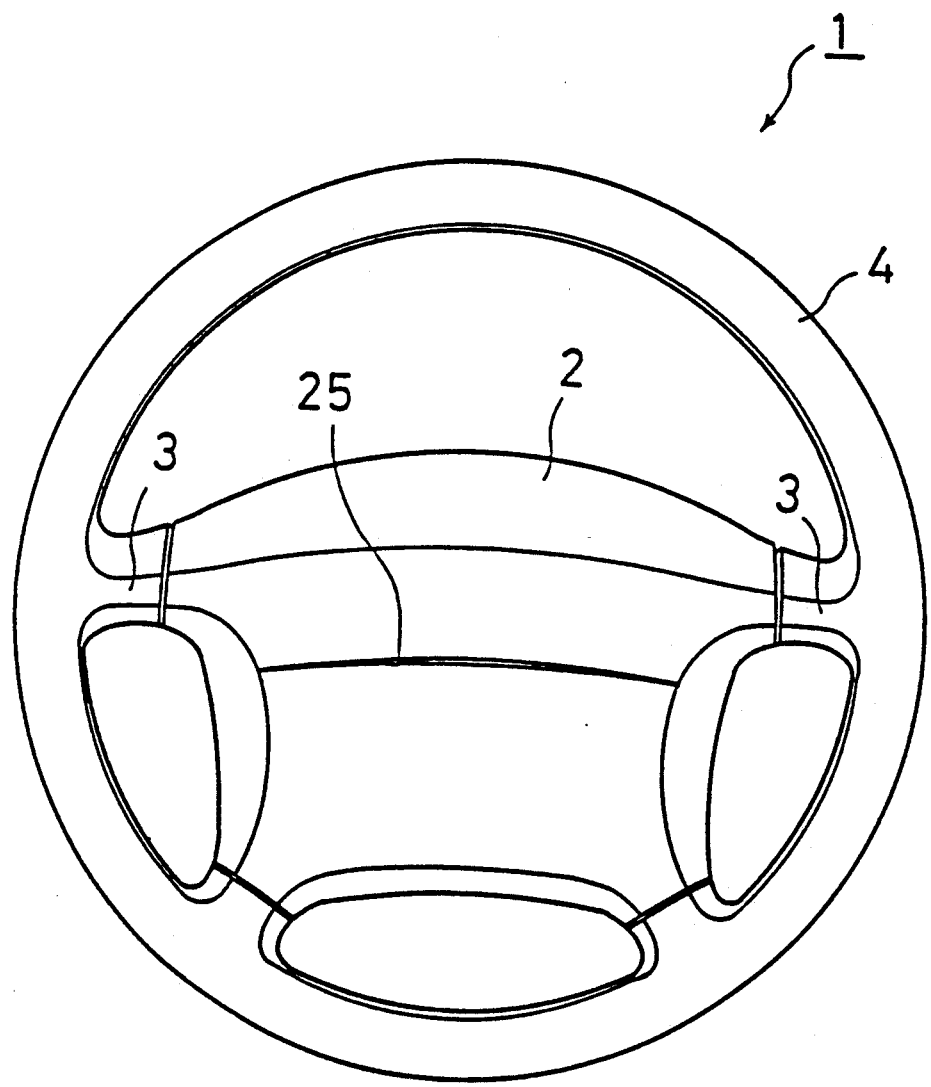
FIG. 3 is a plan view of the steering wheel according to the same embodiment.

A steering wheel 1 equipped with an air bag system according to the present invention has a pad section 2 located at center, spokes 3, and a ring 4 as shown in a plan view of FIG. 3.

Figure 1:
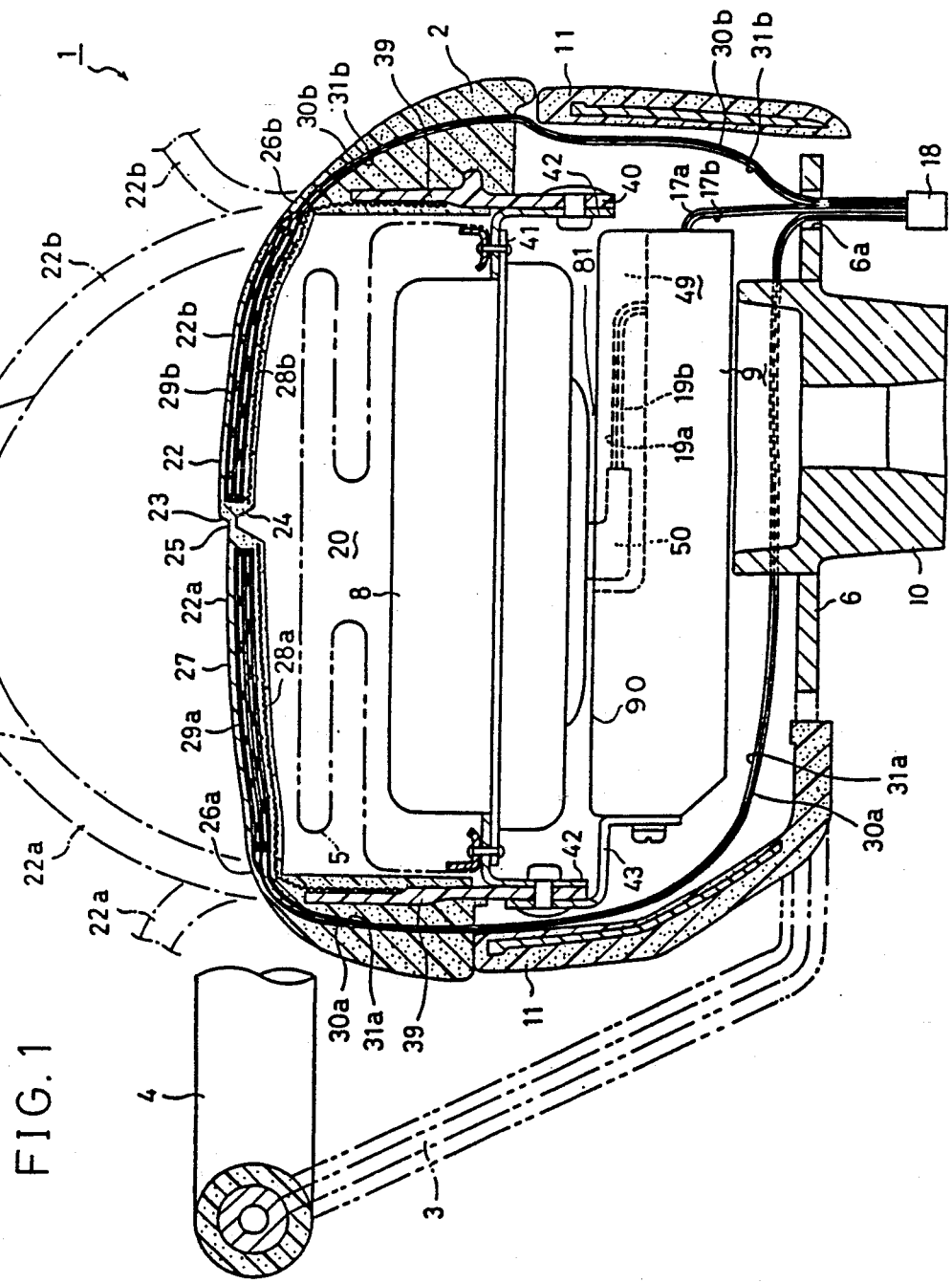
FIG. 1 is a longitudinal sectional view showing a steering wheel equipped with an air bag system according to one embodiment of the present invention.
Figure 2:
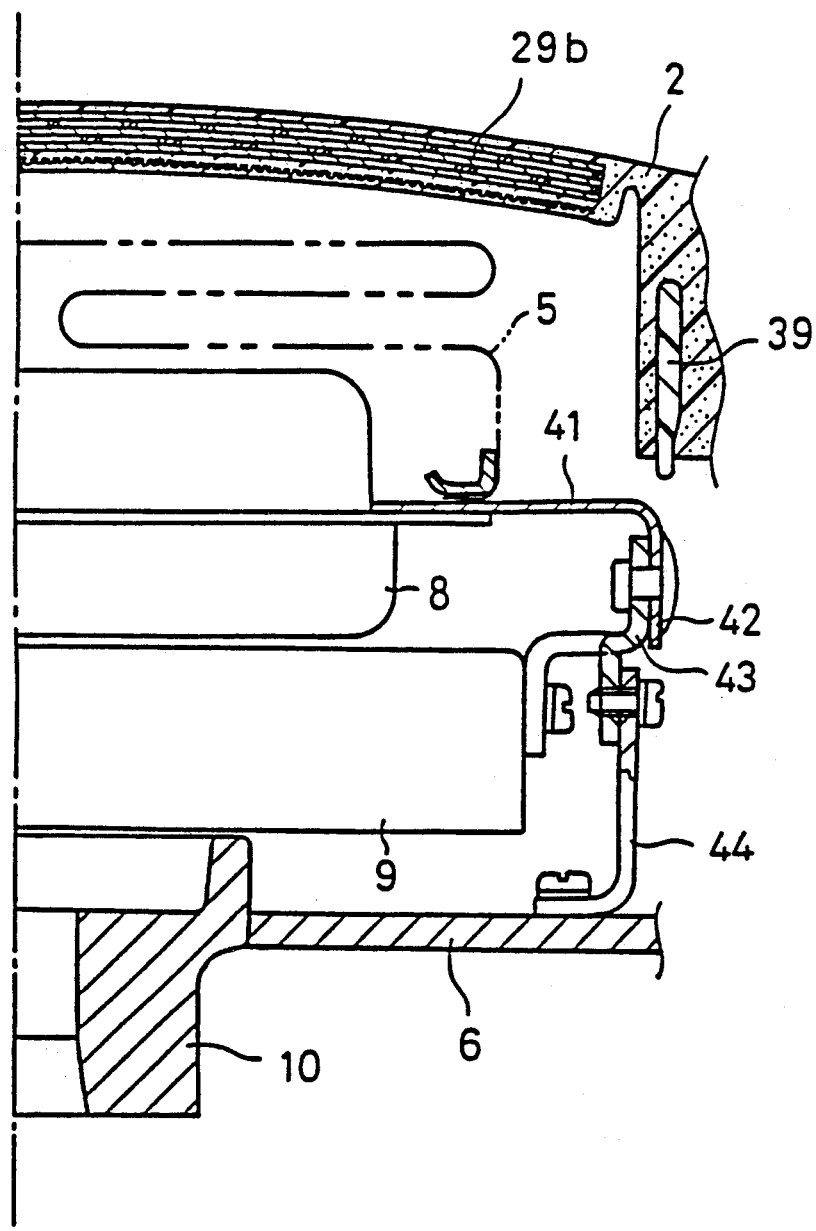
FIG. 2 is a partly longitudinal sectional view showing a fixed state of an inflator and a controller according to the same embodiment.

FIG. 1 is a longitudinal sectional view showing the steering wheel equipped with the air bag system according to the present invention; and FIG. 2 is a partly longitudinal sectional view showing an inflator and a controller according to the present embodiment in a fixed stated.

The pad section 2, as shown in FIG. 1, has an approximate rectangular form. In space 20 provided therein is contained a folded air bag 5. This pad section 2 is formed of expanded urethane foam with a rigid resin mounting member 39 inserted. This mounting member 39 is an annular type formed merely of the side of the rectangular container. In the inside space 20 at the center of this mounting member 39 an inflator 8 is fitted to an L-shaped annular flange 41, which is riveted at a downward extending side wall 42 to a side wall 40 of the downward projecting mounting member 39.

Beneath the inflator 8 is mounted the controller 9 which is bolted through a bracket 43 to the side wall 42 of the flange 41. In the installed state, there is provided a clearance 81 as a heat-insulation layer between the surface of the controller 9 and the surface of the inflator 8 opposite to the surface of the controller 9.

The spokes 3 are joined to a metal plate 6 extended from a boss 10. The pad section 2 is installed on the metal plate 6 by bolting the bracket 43 to an attachment 44 fastened by bolts to the metal plate 6 as shown in FIG. 2. Also, as shown in FIG. 1, a cover 11 is mounted as if to cover the lower part of the pad section 2.

In the meantime, as shown in FIG. 1, the upper surface 22 of the pad section 2 is provided with grooves 23 and 24 inside and outside at center to form a thin-wall section 25. This thin-wall section 25 is broken off with a pressure when the air bag 5 is inflated. Two upper surfaces 22a and 22b thus broken off at the thin-wall section 25 are designed to open to both sides on fixed ends 26a and 26b on both sides where no thin-walled part is formed.

In an inner layer section 27 of the upper surface 22 of the pad section 22 are inserted meshes 28a and 28b and membrane switches 29a and 29b whose ends are fixed to the mounting members 39 on both sides of the thin-wall section 25 located at center.

The controller 9 has a pair of lead wires 17a and 17b, and the membrane switches 29a and 29b have a pair of lead wires 30a and 31a and a pair of lead wires 30b and 31b respectively. Of these six lead wires, the lead wire 17a of the controller 9 and the lead wires 30a and 30b of the membrane switches 29a and 29b are signal wires, while the lead wire 17b of the controller 9 and the lead wires 31a and 31b of the membrane switches 29a and 29b are ground wires. These lead wires are connected to a connector 18 through a hole 6a made in the metal plate 6.

The lead wires connected to the connector 18 are each connected to for example a known slip ring through a lead wire of a counterpart connector not illustrated. The controller 9 and the membrane switches 29a and 29b are electrically connected to a car body side by utilizing slide between the slip ring and a slider. A relay system to be adopted may be a spiral type utilizing a tape wire.

Also the signal lead wire 19a and the grounding lead wire 19b from the controller 9 are connected to the bottom side of the inflator 8 through a plastic connector 50 by using a groove-like recess 49 provided in the controller 9.

Figure 4:
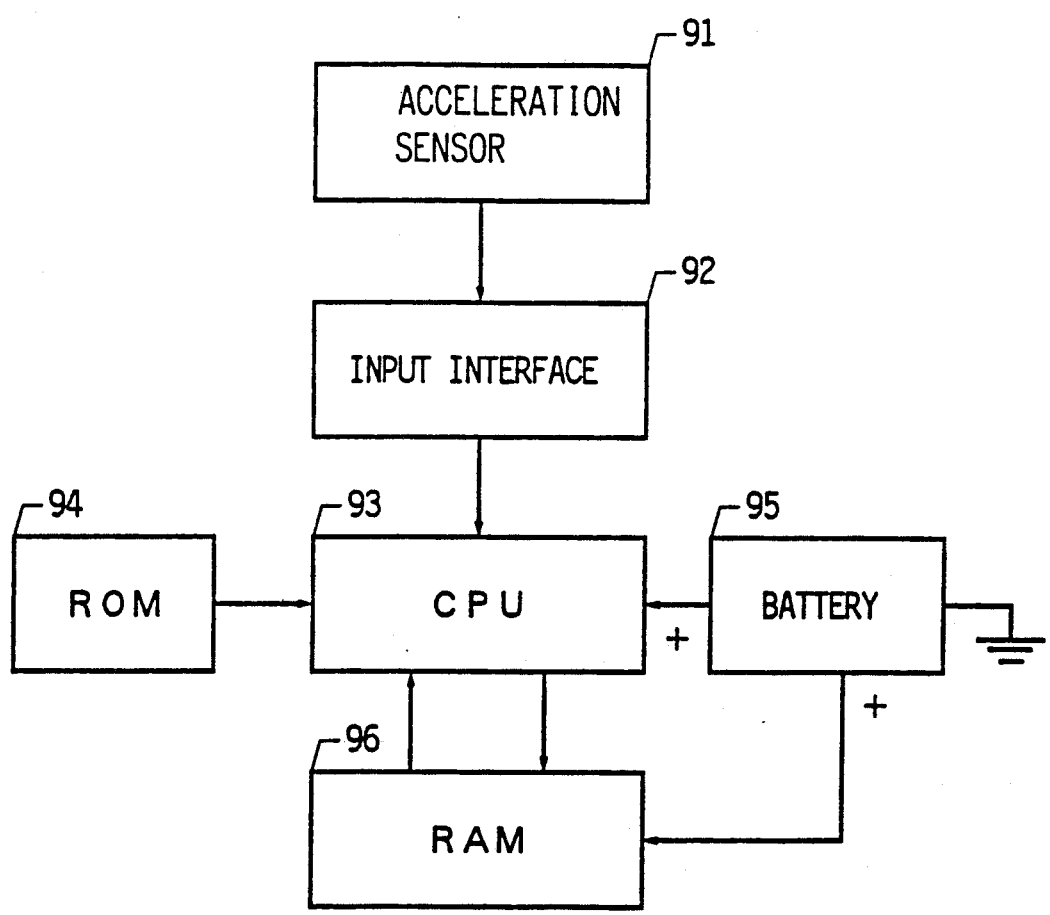
FIG. 4 is a block diagram showing the electrical constitution of the controller mounted in the steering wheel according to the same embodiment.

The controller 9 has an electric circuit of constitution shown in FIG. 4. That is, the controller 9 consists of a acceleration sensor 91, an input interface 92, a CPU 93, a ROM 94, a RAM 96, and a battery 95. The CPU 93 functions to sense acceleration being exerted to the car body in order to judge whether or not the vehicle body is in collision, performing a processing for outputting a trigger signal for inflating the air bag 5. The ROM 94 stores a program for the processing. The RAM 96 stores the value of the acceleration sensed until the trigger signal is outputted, i.e., the value of a control parameter to be used in the processing. The battery 95 supplies power to the CPU 93, holding the stored contents in the RAM 96 even after the inflation of the air bag 5 caused by a collision of the car body. The acceleration sensor 91 senses a acceleration of the car body in order to sense a collision of the car body. The input interface 92 is used to connect a sensing signal from the acceleration sensor 91 to the CPU 93.

The RAM 96 described above is taken out of the controller 9 after the inflation of the air bag 5, for the analysis of the process of operation of the CPU 93, thereby enabling improvements for more accurate air bag 5 operation timing and more accurate sensing of a collision for the purpose of preventing malfunction and misoperation.

This controller 9 monitors the acceleration of the car body at all times, and outputs a trigger signal to the inflator 8 upon sensing a collision of the car body from a sudden change in the acceleration. The inflator 8 activates an explosive cartridge in response to the trigger signal, thus supplying a high-pressure gas into the air bag 5.

At this time, the temperature of a case 80 of the inflator 8 rises. The surface temperature of this inflator case 80 reaches a peak value of 200°–250° C. a little after the operation of the inflator 8. In the conventional state that the inflator case 80 is in contact with the case 90 of the controller 9, the peak temperature around the ROM 96 installed in the controller 9 reaches the vicinity of 100° C.

According to the present invention, as described above, the inflator 8 and the controller 9 are attached at their periphery through the flange 41 and the bracket 43 between the opposite surfaces of the controller case 90 and the inflator case 80 so that the air gap 81 as the heat-insulating layer may be provided. That is, the inflator case 80 is not in contact with the controller case 90, thereby preventing heat transmission to the controller 9 in the event of operation of the inflator 8.

With the air gap 81 provided 0.5 mm wide as the heat-insulating layer, the peak temperature near the RAM 96 built in the controller 9 could be lowered from 100° C. stated above to around 65° C.

Therefore it is understood that providing an at least 0.5 mm air gap as the heat-insulating layer can prevent the RAM 96 built in the controller 9 from being destroyed with heat.

For the heat-insulating layer provided between the inflator case 80 and the controller case 90, a heat insulating material such as rigid urethane foam (a product of reaction of polyester or polyether and isocyanate), glass wool, rock wool, a rubber sheet or plastic sheet may be used in place of the air gap.

Furthermore, the bracket 43 riveted to the side wall 42 of the flange 41 of the inflator 8 and securing the controller 9, may be formed of a heat-insulating resin.

Second Embodiment

Figure 5:
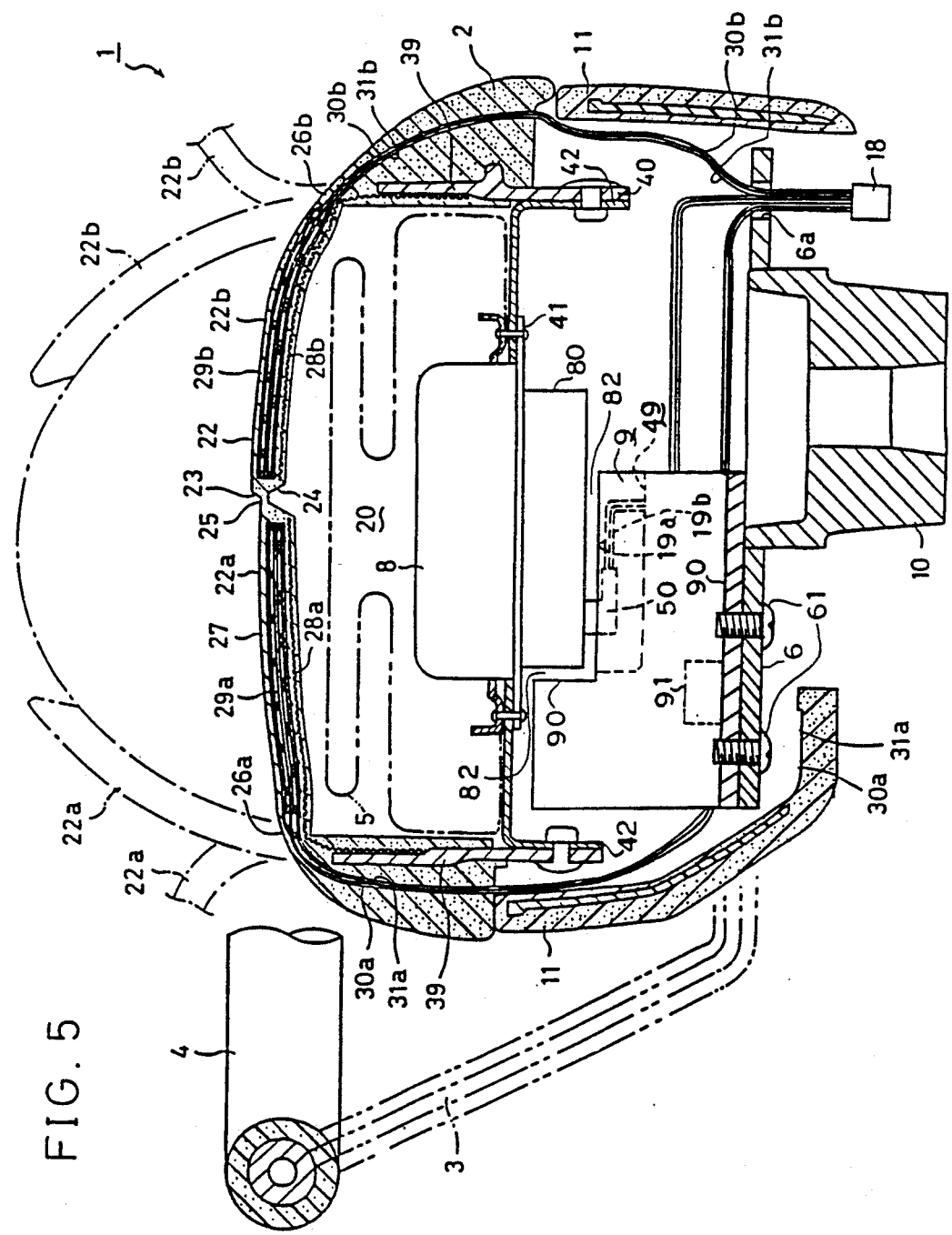
FIG. 5 is a longitudinal view showing a steering wheel equipped with an air bag system according to another embodiment of the present invention.

The controller case 90 may be secured by a screw 61 to the metal plate (a boss plate) as shown in FIG. 5. In this case, an air gap 82 is provided as the heat-insulating layer between the surface of the controller case 90 and the surface of the inflator case 80 opposite to the surface of the controller case 90. The controller case 90, therefore, is not in direct contact with the inflator case 80, thereby enabling preventing heat transmission to the controller case 90 when the inflator 8 is actuated, for the protection of the RAM 96 in the controller 9 from heat destruction.

The metal plate 6 is extendedly provided on the boss 10. The boss 10 is attached on the forward end of the steering shaft mounted on the car body side. Therefore when the controller case 90 is fixed directly on the metal plate 6, the acceleration sensor 91 senses acceleration applied on the metal plate 6, i.e. acceleration applied on the car body. This enables more accurate judgment of collision of the car body.

While there has been described what is at present considered to be the preferred embodiments of the present invention, it will be understood that various modifications may be made therein, and it is intended to cover in the appended claims all such modifications as fall within the true spirit and scope of the present invention.

What is claimed is:

1. A steering wheel equipped with an air bag system for use in a vehicle, comprising:
    a pad section;
    an air bag disposed in said pad section;
    a controller, disposed in said pad section and comprising:
        a case;
        a processor, disposed in said case, for sensing an impact caused by collision of said vehicle and outputting a trigger signal relating to said impact; and
        a memory, disposed in said case, for storing data relating to a control parameter processed by said processor to generate said trigger signal, said memory continuing storing said data after said impact;
    an inflator, disposed proximate to said controller, for generating, in accordance with said trigger signal, a gas to inflate said air bag; and
    a heat-insulating layer provided between a surface of said case of said controller and a surface of said inflator.

2. A steering wheel as claimed in claim 1, said heat-insulating layer being an air gap.

3. A steering wheel as claimed in claim 2, said heat-insulating layer being a 0.5 mm or wider air gap.

4. A steering wheel as claimed in claim 1, said heat-insulating layer being one of a rubber and plastic sheet.

5. A steering wheel as claimed in claim 1, further comprising a boss having a metal plate provided thereon, said controller being mounted on said metal plate.

6. A steering wheel as claimed in claim 1, said controller further comprising:
    an acceleration sensor for sensing acceleration of said vehicle to sense a collision of said vehicle;
        a CPU for determining inflation time of said air bag in accordance with said acceleration sensed by said acceleration sensor; and
    a battery,
    said memory comprising a RAM for storing said data, said control parameter relating to said acceleration sensed until said trigger signal is generated by said CPU, said battery providing power to said RAM to cause said RAM to store said data after inflation of said air bag.

7. A steering wheel as claimed in claim 1, further comprising a flange and a bracket for coupling said inflator to said case of said controller to provide an air gap therebetween, said air gap being said heat-insulating layer.

8. A steering wheel as claimed in claim 1, said pad section comprising expanded urethane foam and a rigid mounting member, said inflator being disposed in an inside space in said pad section and secured by an L-shaped annular flange having an extending side wall secured to a downward projecting portion of said mounting member, and said steering wheel further comprising a bracket, secured to said extending side wall of said flange, for securing said controller beneath said inflator to provide said heat-insulating layer between said case of said controller and said inflator.

9. A steering wheel as claimed in claim 8, said air bag being folded and disposed on said inflator in said inside space of said pad section.

10. A steering wheel as claimed in claim 8, said heat-insulating layer being an air gap provided between said case of said controller and said inflator.

11. A steering wheel as claimed in claim 8, said controller further comprising:
    an acceleration sensor for sensing acceleration of said vehicle to sense a collision of said vehicle;
    a CPU for determining inflation time of said air bag in accordance with said acceleration sensed by said acceleration sensor; and
    a battery,
    said memory comprising a RAM for storing said data, said control parameter relating to said acceleration sensed until said trigger signal is generated by said CPU, said battery providing power to said RAM to cause said RAM to store said data after inflation of said air bag.

12. A steering wheel as claimed in claim 1, said pad section comprising expanded urethane foam and a rigid mounting member, said inflator being disposed in an inside space in said pad section and secured by an L-shaped annular flange having an extending side wall secured to a downward projecting position of said mounting member, and said steering wheel further comprising:
    a boss;
    a metal plate, provided on said boss, for securing said controller proximate to said inflator to provide said heat-insulating layer between said case of said controller and said inflator.

13. A steering wheel as claimed in claim 12, said controller further comprising:
    an acceleration sensor for sensing acceleration of said vehicle to sense a collision of said vehicle;
    a CPU for determining inflation time of said air bag in accordance with said acceleration sensed by said acceleration sensor; and
    a battery,
    said memory comprising a RAM for storing said data, said control parameter relating to said acceleration sensed until said trigger signal is generated by said CPU, said battery providing power to said RAM to cause said RAM to store said data after inflation of said air bag.

14. A steering wheel as claimed in claim 12, said heat-insulating layer being an air gap provided between said case of said controller and said inflator.

* * * * *